US011285962B2

(12) United States Patent
Aman et al.

(10) Patent No.: US 11,285,962 B2
(45) Date of Patent: Mar. 29, 2022

(54) METHODS AND SYSTEMS OF ONE-CLICK REGISTRATION OF DRIVERS IN A LOAD TRANSPORT NETWORK

(71) Applicants: Syed Aman, santa clara, CA (US); Sharanjeet Singh Grewal, san ramon, CA (US); Zahed Khan, los angeles, CA (US); Wan-Ju Wang, santa clara, CA (US)

(72) Inventors: Syed Aman, santa clara, CA (US); Sharanjeet Singh Grewal, san ramon, CA (US); Zahed Khan, los angeles, CA (US); Wan-Ju Wang, santa clara, CA (US)

( * ) Notice: Subject to any disclaimer, the term of this patent is extended or adjusted under 35 U.S.C. 154(b) by 0 days.

(21) Appl. No.: 17/020,810

(22) Filed: Sep. 15, 2020

(65) Prior Publication Data

US 2021/0107490 A1    Apr. 15, 2021

Related U.S. Application Data

(60) Provisional application No. 62/900,845, filed on Sep. 16, 2019.

(51) Int. Cl.
*G08B 23/00* (2006.01)
*B60W 40/08* (2012.01)
(Continued)

(52) U.S. Cl.
CPC ............ *B60W 40/08* (2013.01); *B60W 50/08* (2013.01); *H04W 4/029* (2018.02);
(Continued)

(58) Field of Classification Search
CPC .............. B60W 40/08; B60W 50/08; B60W 2040/0809; B60W 2040/0881; B60W 2556/45; H04W 4/029
(Continued)

(56) References Cited

U.S. PATENT DOCUMENTS

| 2008/0129547 A1* | 6/2008 | Shinoda ................. G08G 1/205 340/991 |
| 2011/0210835 A1* | 9/2011 | Kondo .................... G08G 1/205 340/425.5 |

(Continued)

*Primary Examiner* — Tai T Nguyen

(57) ABSTRACT

A computer-implemented method for one-click registration drivers in a load transport network via a mobile device messaging application includes the step of obtaining a driver information in a digital format. The method includes the step of passing via a computer network, the driver information to a driver registration/tracking application programming interface (API). The method includes the step of storing the driver information in a database; generating a hyperlink and send hyperlink to driver's smart phone as a text message, hyperlink includes a parameter mapped to the driver. The method includes the step of receiving a message that the driver has clicked on the hyperlink. The method includes the step of downloading a driver registration/tracking application to the mobile device after the driver has clicked on the hyperlink. The method includes the step of, with the driver registration/tracking application, requesting and fetching, with a driver registration/tracking application server functionality, the driver information from the database. The method includes the step of loading the driver information into the driver registration/tracking application and one-click set up is presented via a virtual button displayed with the mobile device.

15 Claims, 8 Drawing Sheets

(51) Int. Cl.
*B60W 50/08* (2020.01)
*H04W 4/029* (2018.01)

(52) U.S. Cl.
CPC .............. *B60W 2040/0809* (2013.01); *B60W 2040/0881* (2013.01); *B60W 2556/45* (2020.02)

(58) Field of Classification Search
USPC ...................................................... 340/573.1
See application file for complete search history.

(56) References Cited

U.S. PATENT DOCUMENTS

2017/0086045 A1* 3/2017 Lucero .................... H04W 4/90
2019/0373671 A1* 12/2019 Kamata ............... H04W 64/003

* cited by examiner

Action: Click on the link

Who: Driver

Where: Mobile SMS message

Hi Ruby (XYZ Transport LLC)!
Welcome to Hwy Haul. Please
download the app: https://
hwyhaul.page.link/sG2
Please do not text while driving.
*Code: 1221

Data: a parameter mapping to this driver

Generate a link with this parameter appended

Send the SMS message to the driver

METHODS AND SYSTEMS OF ONE-CLICK REGISTRATION OF DRIVERS IN A LOAD TRANSPORT NETWORK

CLAIM OF PRIORITY

This application claims priority to U.S. Provisional Patent Application No. 62/900,845, filed on 16 Sep. 2019, and title METHODS AND SYSTEMS OF ONE-CLICK REGISTRATION OF DRIVERS IN A LOAD TRANSPORT NETWORK. This application is incorporated by reference in its entirety.

BACKGROUND

Currently, non-tech-savvy truck drivers often struggle to type and input any information (e.g. password and/or email solutions) on mobile device applications. There is a need for a simple, no typing required flow to dramatically remove the sign-up friction.

As the same time, improvements to mobile device applications are available to automate various aspects of multi-trip-itinerary planning for truck drivers such as automating driver registration. These can be used to increase the efficiency of driver signup protocols. Accordingly, methods of reducing driver registration complexity are desired.

SUMMARY OF THE INVENTION

A computer-implemented method for one-click registration drivers in a load transport network via a mobile device messaging application includes the step of obtaining a driver information in a digital format. The method includes the step of passing via a computer network, the driver information to a driver registration/tracking application programming interface (API). The method includes the step of storing the driver information in a database; generating a hyperlink and send hyperlink to driver's smart phone as a text message, hyperlink includes a parameter mapped to the driver. The method includes the step of receiving a message that the driver has clicked on the hyperlink. The method includes the step of downloading a driver registration/tracking application to the mobile device after the driver has clicked on the hyperlink. The method includes the step of, with the driver registration/tracking application, requesting and fetching, with a driver registration/tracking application server functionality, the driver information from the database. The method includes the step of loading the driver information into the driver registration/tracking application and one-click set up is presented via a virtual button displayed with the mobile device.

Screen shots illustrating an example use case of implementing process 100 are provided in FIGS. 2-6, according to some embodiments.

Figure 7:
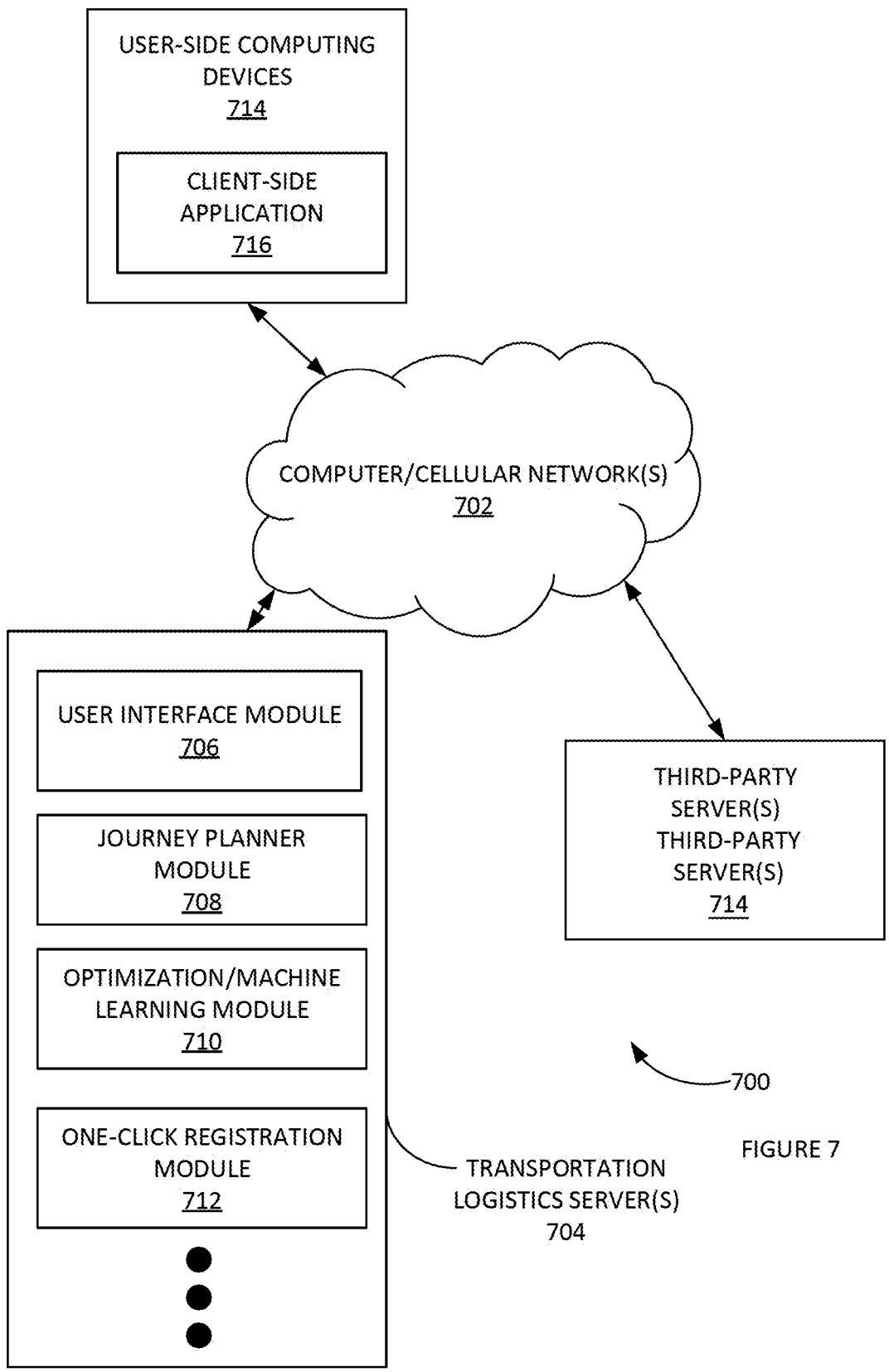

FIG. 7 illustrates an example transportation logistics system that implements one-click registration of drivers, according to some embodiments.

Figure 8:
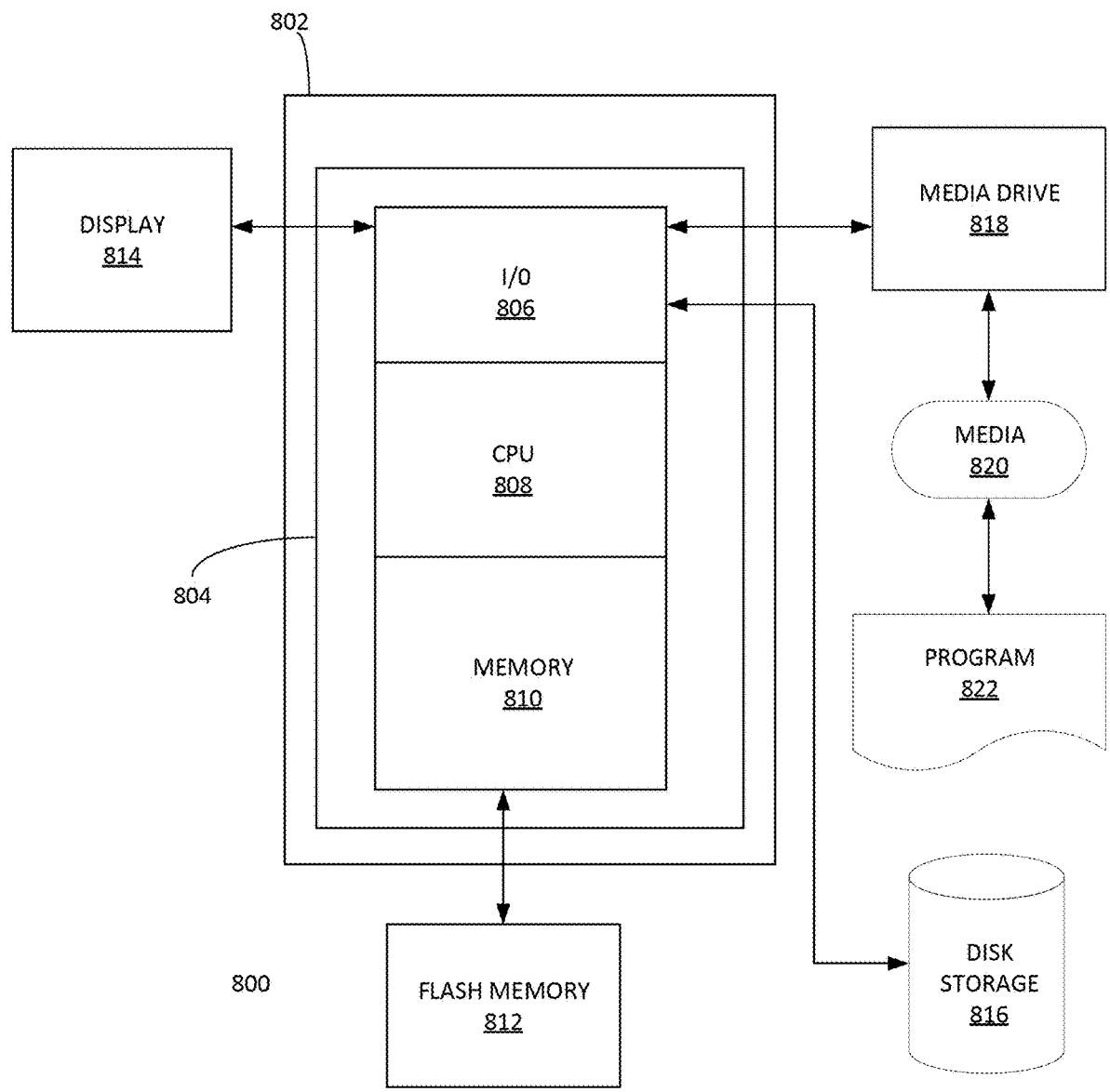

FIG. 8 depicts an exemplary computing system that can be configured to perform any one of the processes provided herein.

The Figures described above are a representative set and are not exhaustive with respect to embodying the invention.

DESCRIPTION

Disclosed are a system, method, and article of one-click registration of drivers in a load transport network. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) is a set of subroutine definitions, communication protocols, and/or tools for building software. An API can be a set of clearly defined methods of communication among various components.

Cloud computing can involve deploying groups of remote servers and/or software networks that allow centralized data storage and online access to computer services or resources. These groups of remote serves and/or software networks can be a collection of remote computing services.

Example Methods

Figure 1:
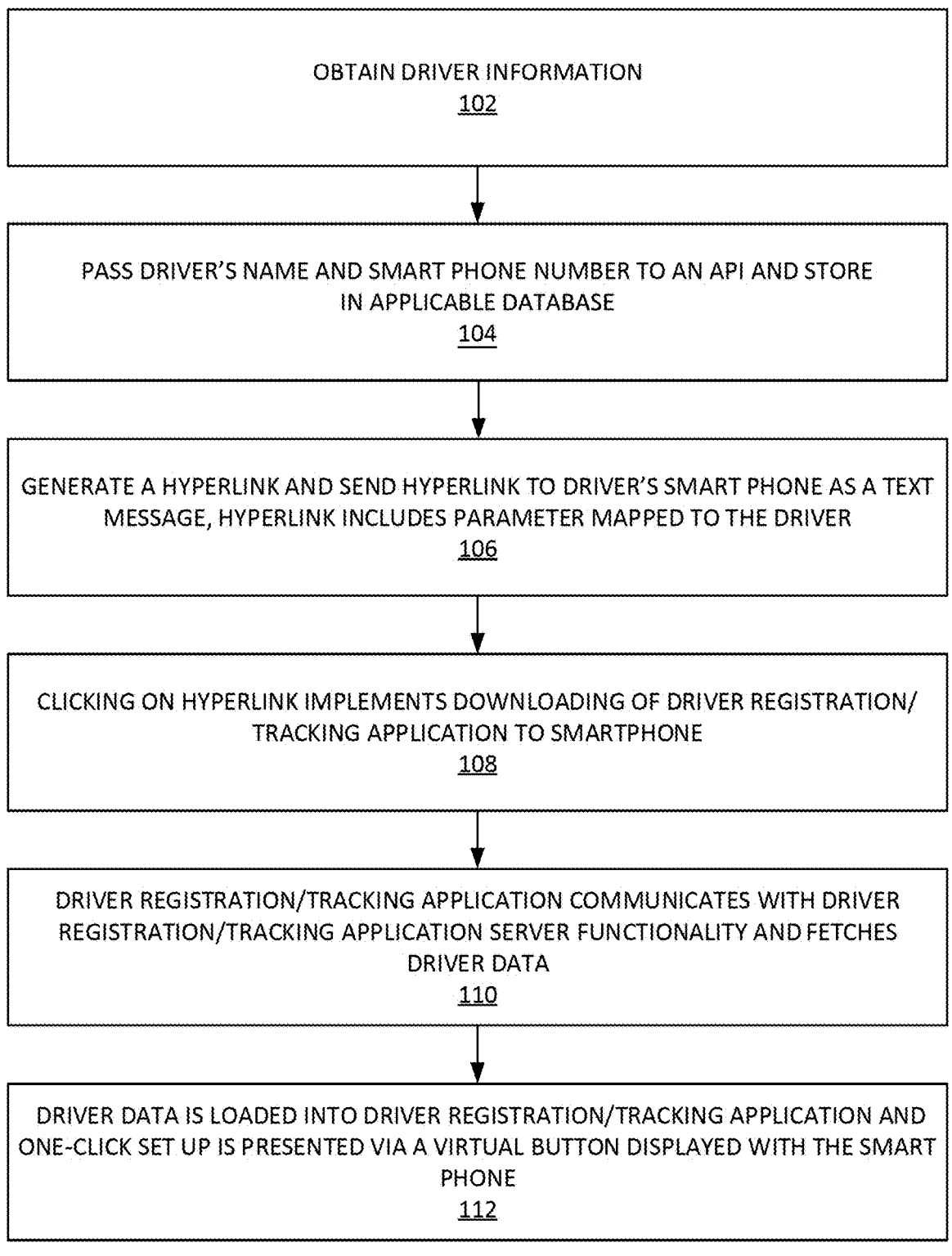
FIG. 1 illustrates an example system one-click registration of drivers in a load transport network, according to some embodiments.
Figure 2:
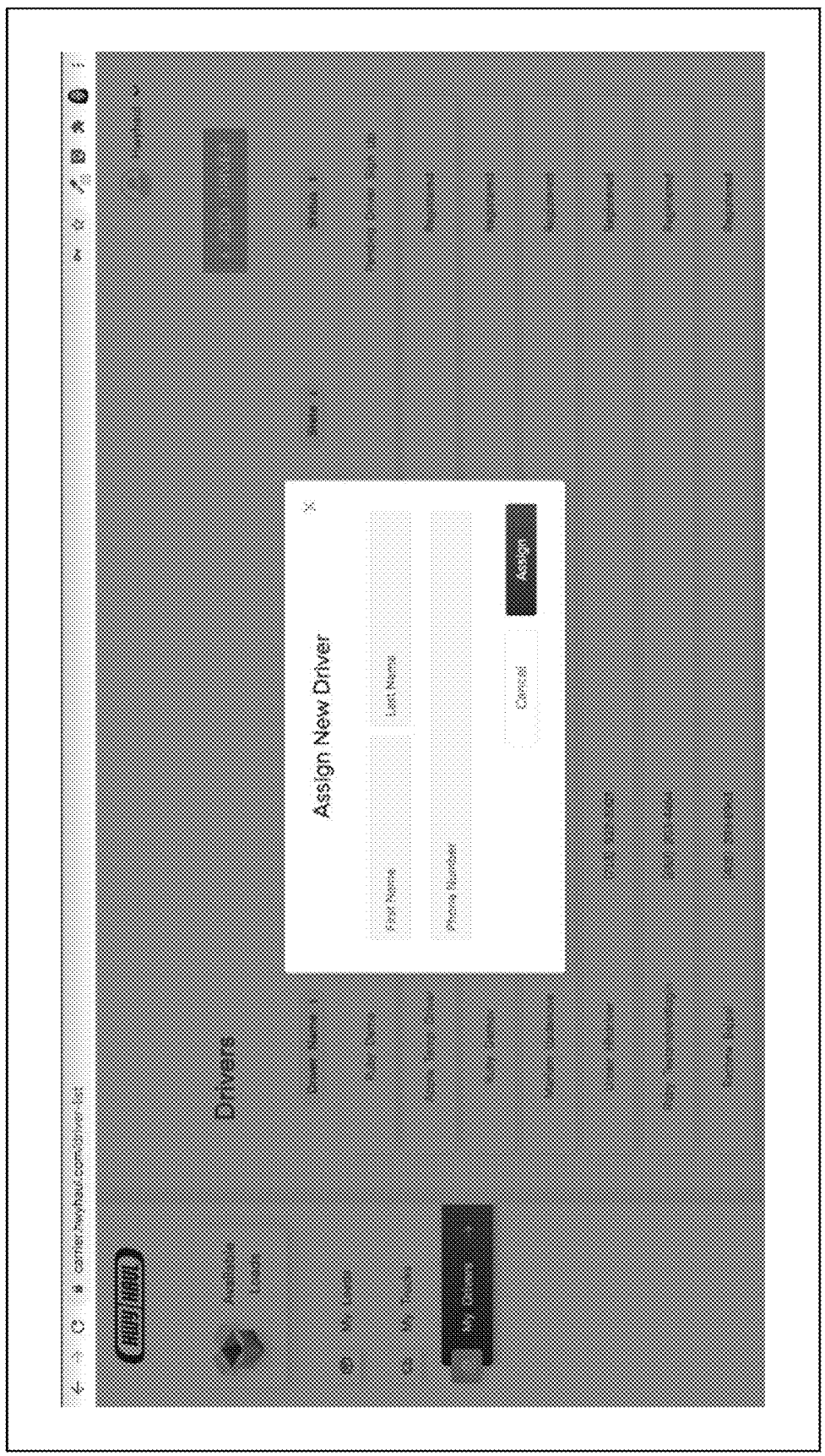
Figure 4:
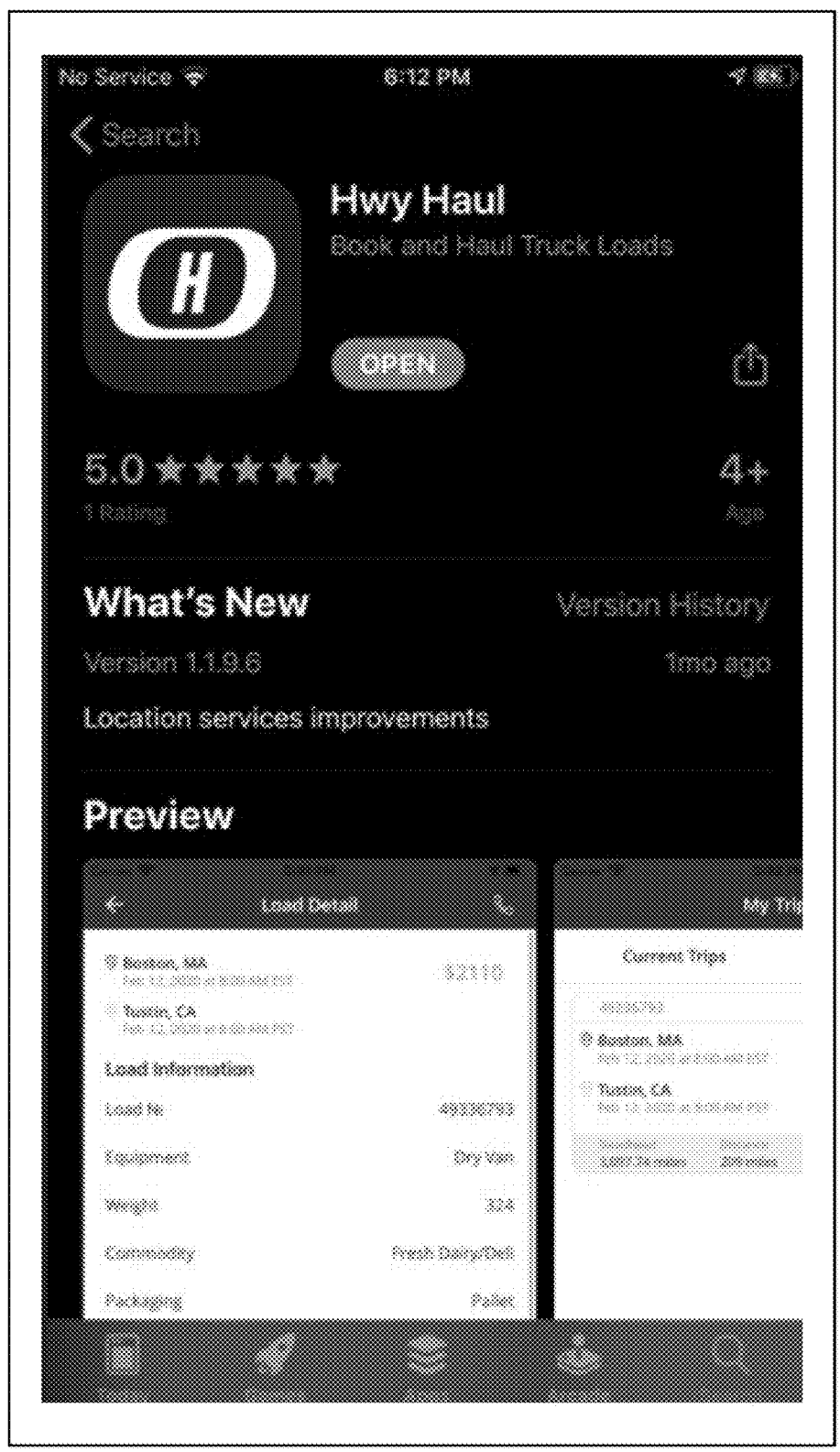
Figure 5:
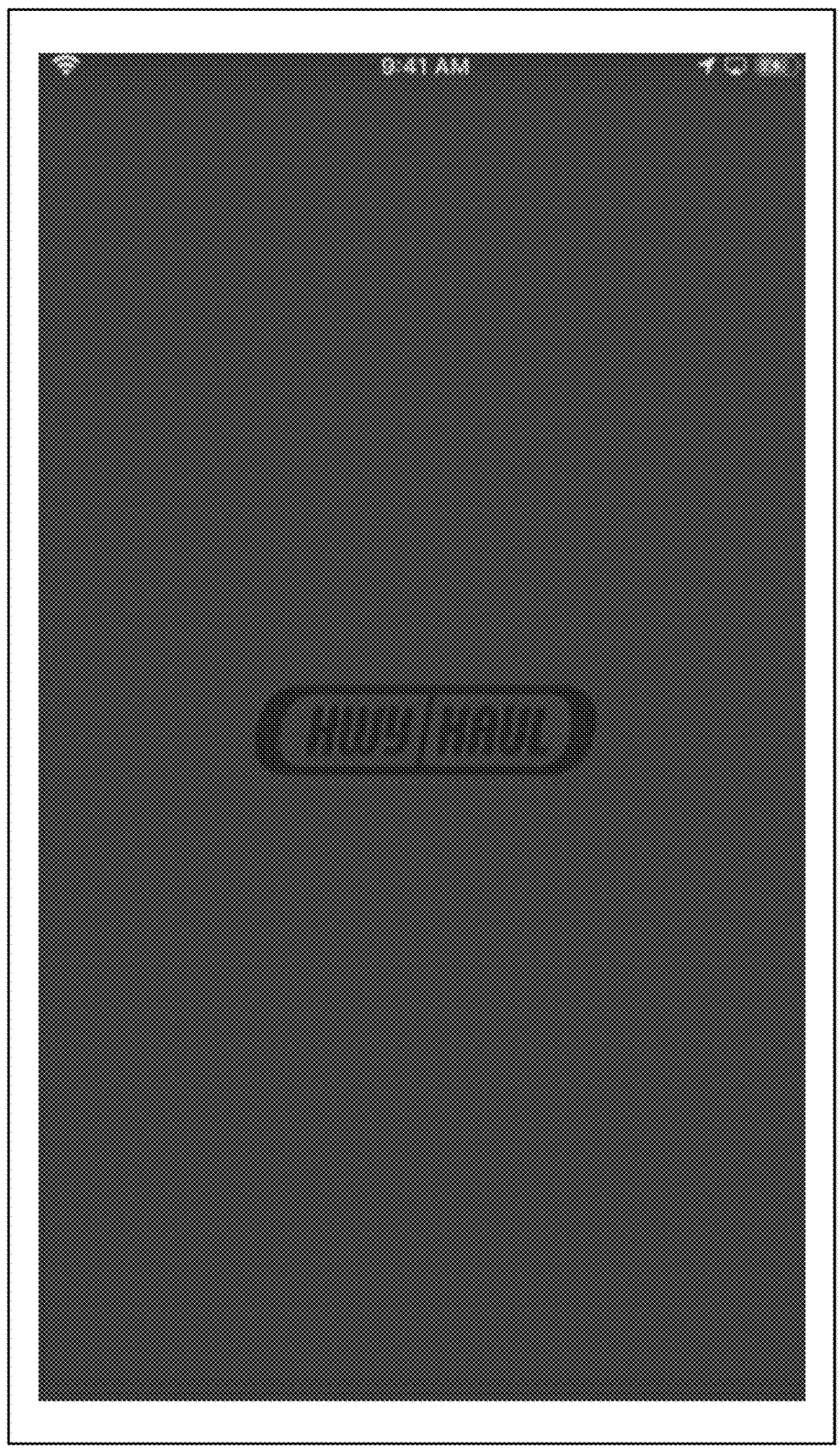
Figure 5:
Figure 6:
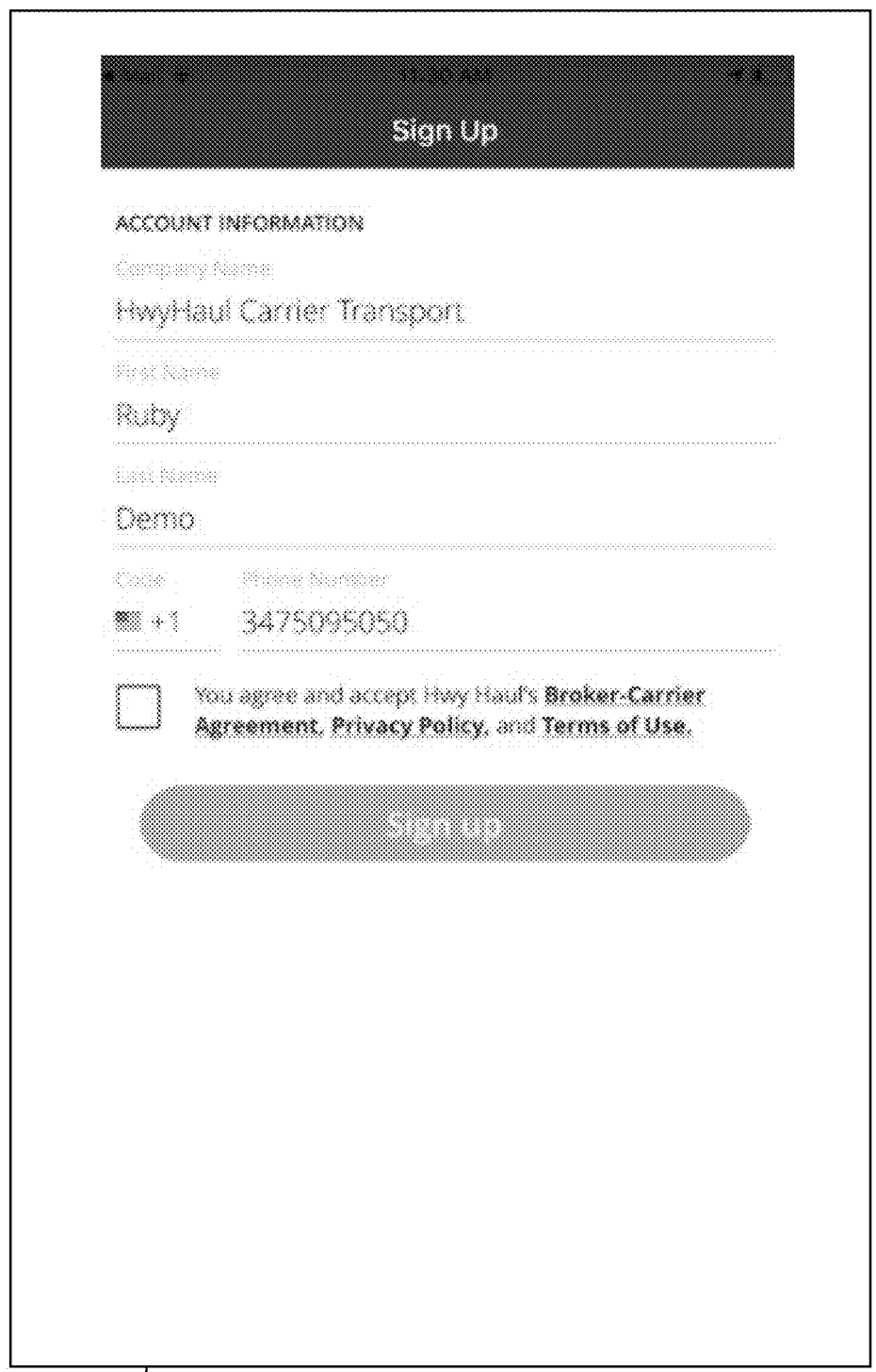

FIG. 1 illustrates an example system 100 one-click registration of drivers in a load transport network, according to some embodiments. The load transport network can be for the route planning of container vehicles. A container vehicle can be a truck, an airplane, a delivery vehicle, a container ship, autonomous vehicle, drone, and the like. Process 100 can be used in registering and tracking drivers of container vehicles in a simple and straightforward manner. In this way, non-tech-savvy truck drivers who used to struggle to type and input any information (e.g. password and/or email solutions) can use a simple, no typing required flow to dramatically remove the sign-up friction.

In step 102, process 100 can obtain driver information. In step 104, process 100 can pass driver's name and smart phone number to a driver registration/tracking API and store in applicable database. In step 106, process 100 can generate a hyperlink and send hyperlink to driver's smart phone as a text message, hyperlink includes parameter mapped to the driver. In step 108, by clicking on hyperlink, process 100 implements the downloading of driver registration/tracking application to the smartphone. In step 110, process 100 can enable the driver registration/tracking application communicates with driver registration/tracking application server functionality and fetches driver data. In step 112, the driver data is loaded into driver registration/tracking application and one-click set up is presented via a virtual button displayed with the smart phone.

Screen shots illustrating an example use case of implementing process 100 are provided in FIGS. 2-6, according to some embodiments. FIGS. 2-6 also include additional information relating the steps of process 100 to the respective screenshots, according to some embodiments Example Systems FIG. 7 illustrates an example transportation logistics system that implements one-click registration of drivers, according to some embodiments. Transportation logistics system 700 is a computerized system and includes/utilized various computer/cellular networks 702.

Transportation logistics server(s) 704 can implement the various processes provided herein (e.g. process 100, process provided in FIGS. 2-6, etc.). Additionally, transportation logistics server(s) 704 can provide Transportation as a Service (TaaS)/Logistics as a Service (LaaS). Accordingly, Transportation logistics server(s) 704 can include a TaaS and/or a LaaS platform(s). The TaaS/LaaS platform(s) can have the following capabilities packaged as webservices. These webservices can seamlessly integrate with various other enterprise software (e.g. a TMS (Transportation Management System), WMS (Warehouse Management Systems) and/or VMS (Yard Management System)Routing as a Service. The TaaS/LaaS platform(s) can optimize a route for a truck driver).

Transportation logistics server(s) 704 can implement a Pricing as a Service (PaaS) platform. PaaS can quote the recommended price for a load given such parameters as, inter alia: origin, destination, commodity, eight and other load parameters.

Transportation logistics server(s) 704 can implement Checking as a Service platform. This platform can communicate ETA pings real time to any subscriber (e.g. including third-party enterprise software. Transportation logistics server(s) 704 can implement a Loading as a Service platform. This platform can dictate how a trailer (and/or other load container) is to be loaded in order to achieve maximum load efficiencies.

Transportation logistics server(s) 704 can provide a Brokerage as a Service (BaaS) platform. The BaaS platform can provide a solution for brokers as a Brokerage as a Service (BaaS). BaaS can be a subscription-based web portal and/or mobile application (e.g. see client-side application 716, etc.). This can enable traditional brokers to digitalize themselves by leveraging the benefits offered by Transportation logistics server(s) 704 BaaS capabilities. These can include, inter alia: create load for their customers (e.g. using the portal or via other channels such as APIs, EDI, webservices, webhooks, etc.); manage load lifecycle for all the customers including status changes; real time freight tracking; smart monitoring alerts; push notifications; communicating to the customers; automated invoicing to their customers; automated payments to their carriers (e.g. trucking companies, owner operators, autonomous trucks companies, freight drones companies); receive digital copies of BOL (Bill of Lading); POD (Proof of Delivery); signatures etc. from the carriers and passing those on to the customers; OCR based BOL, POD scanning and data extractions and parsing; etc.

Transportation logistics server(s) 704 can provide/manage embedded software for autonomous trucks and freight drones OEMs (Original equipment manufacturer). An example is now provided. An autonomous truck can be manufactured and drives out of the factory. The autonomous truck can be programmed to drive to a specified destination and to pick up a first load. The transportation logistics server(s) 704 can provide/manage the guidance/control software that is installed/embedded in it. This software for autonomous trucks OEMs as well as for freight drones. This can enable these OEMs to unlock "digital freight brokerage" capabilities. This can be used as a revenue stream for these OEMs. The OEM can continue to monetize on the autonomous truck throughout its lifecycle. The autonomous truck and pick up the load locally and takes to a nearby port. The autonomous truck can then unload to a ship that is then routed to another seaport (e.g. Los Angeles, Calif.). There, the load is picked up by a drayage/inter-modal provider. The is then distributed again across America through autonomous trucks or freight drones. The end customer and/or any stakeholder (e.g. shipper, receiver, broker, etc.) can have extreme visibility of all of this freight in an end-to-end manner through the services provided by the transportation logistics server(s) 704. Accordingly, Transportation logistics server(s) 704 can include the various functionalities powered by, inter alia: data science, machine learning, artificial intelligence and optimization algorithms running on a platform of Blockchain.

In addition to implementing the above services, transportation logistics server(s) 704 can provide/include various modules for implementing transportation services. Transportation logistics server(s) 704 can include a user interface module 706. User interface module 706 can manage a client-side application 716. User interface module 706 can provide relevant information to a mobile application. User interface module 706 can receive user input and interface with the appropriate systems of transportation logistics server(s) 704. User interface module 706 can receive minimum inputs to a trip planner (e.g. an origin and destination);

place and a date and time of travel; etc. User interface module 706 can provide various methods to discover and specify an origin or destination. This can include, inter alia: a location name; a geocoded place; a stop or station code; a street address; a point of interest; a spatial coordinate; etc. User interface module 706 can provide location finding function of a trip planner. This can be used to resolve the origin and destination into a set of known nodes on the transport network. This data can be provided to journey planner module 708 to compute a trip plan over its data set of known public transport journeys.

Journey planner module 708 can include a journey planning engine and the data sets which are available to it. Journey planner module 708 can use the user inputs to determine the specified parameters of a load journey. (e.g. which transport modes to include or exclude; wait times, costs; routes; etc.). Journey planner module 708 can constrain the time of travel by arrival time, departure time and/or to allow a flexible window within which travel may be undertaken. Journey planner module 708 can provide a preferred routing for the trip via intermediate stop points. Journey planner module 708 can provide trip optimization parameters (e.g. shortest trip, trip with fewest changes, etc.). Journey planner module 708 can include a web mapping service. Web mapping service outputs can be provided to end users as well. Journey planner module 708 can obtain relevant digital maps, satellite imagery, aerial photography, street maps, 360° panoramic views of streets, real-time traffic conditions, and route planning, etc.

Journey planner module 708 can also output a set/list of planned trips and/or planned trip parameters for a user to choose from. These parameters can be displayed on a map. Journey planner module 708 can obtain data from third-party server(s) 314. This can be geo-spatial data, web mapping service data, traffic data, port data, air flight data, cargo ship data, weather data, road condition data, law enforcement data, e-commerce data/services, etc. Journey planner module 708 can provide the times and departure points of trips from stops or stations, with the exact platform to use and even the boarding point on the platform. Journey planner module 708 can provide trip maps showing the path of the trip legs on a map. Journey planner module 708 can provide route maps showing the network topology. Journey planner module 708 can provide stop area maps and other directions to identify the location of the stops at the boarding and alighting points. Journey planner module 708 can provide information on the transfer times needed to make the access and connection legs. Journey planner module 708 can step by step directions in order to follow an access leg to a stop, enter a station or large interchange such as an airport, or make a transfer on a connection leg, including the accessibility characteristics of each step. These outputs can be formatted for display and displayed by the user interface module (e.g. using a mobile-device application, etc.).

Journey planner can include various travel mode specific considerations. Journey planner module can include a path finding functionality. For example, journey planner module can determine a shortest route between two points (e.g. using a Dijkstra's algorithm, weighted graphs, eta Journey planner can use machine learning to optimize routes, delivery schedules, a load-route segmentation and sequence, etc. Journey planner module 708 can provide data to optimization/machine learning module 710.

Optimization/machine learning module 710 can determine the optimal parameters of trips/routes/drivers. Optimization/machine learning module 710 use machine learning methods of historical training data to improve optimizations.

One-click registration module 712 can implement process 100. One-click registration module 712 can serve in client-side application 716 in user-side computing devices. This can include the screens shots shown in FIGS. 2-6 supra. For example, one-click registration module 712 can serve the screen shots of FIG. 2 and obtain the driver information and phone number. One-click registration module 712 can store this information in a database (e.g. data storage 816 infra). One-click registration module 712 can include various text messages functionalities (e.g. SMS systems, MMS systems, instant messaging systems, etc.). One-click registration module 712 can generate a text message as shown in FIG. 3 along with an associated user parameter that is mapped to the user, hyperlink, and/or a route for the user/driver. One-click registration module 712 can set the hyperlink to open a specified application in an application store. One-click registration module 712 can detect when the application is opened and obtain the information about the user/driver and the associated user/driver parameter. One-click registration module 712 can pass driver information to the application in the user's computing device. One-click registration module 712 can ensure that this information is used to populate the one-click sign up page provided to the user/driver in the application. One-click registration module 712 can use the application to track the driver. One-click registration module 712 can communicate the registration information to the other relevant modules of transportation logistics server(s) 704.

Additional Computing Systems

FIG. 8 depicts an exemplary computing system 800 that can be configured to perform any one of the processes provided herein. In this context, computing system 800 may include, for example, a processor, memory, storage, and I/O devices (e.g., monitor, keyboard, disk drive, Internet connection, etc.). However, computing system 800 may include circuitry or other specialized hardware for carrying out some or all aspects of the processes. In some operational settings, computing system 800 may be configured as a system that includes one or more units, each of which is configured to carry out some aspects of the processes either in software, hardware, or some combination thereof.

FIG. 8 depicts computing system 800 with a number of components that may be used to perform any of the processes described herein. The main system 802 includes a motherboard 804 having an I/O section 806, one or more central processing units (CPU) 808, and a memory section 810, which may have a flash memory card 812 related to it. The I/O section 806 can be connected to a display 814, a keyboard and/or other user input (not shown), a disk storage unit 816, and a media drive unit 818. The media drive unit 818 can read/write a computer-readable medium 820, which can contain programs 822 and/or data. Computing system 800 can include a web browser. Moreover, it is noted that computing system 800 can be configured to include additional systems in order to fulfill various functionalities. Computing system 800 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computer-implemented method for one-click registration drivers in a load transport network via a mobile device messaging application comprising:
    obtaining a driver information in a digital format;
    passing via a computer network, the driver information to a driver registration/tracking application programming interface (API);
    storing the driver information in a database;
    generating a hyperlink and send hyperlink to driver's smart phone as a text message, hyperlink includes a parameter mapped to the driver;
    receiving a message that the driver has clicked on the hyperlink;
    downloading a driver registration/tracking application to the mobile device after the driver has clicked on the hyperlink;
    with the driver registration/tracking application, requesting and fetching, with a driver registration/tracking application server functionality, the driver information from the database; and
    loading the driver information into the driver registration/tracking application and one-click set up is presented via a virtual button displayed with the mobile device.

2. The computer-implemented method of claim 1, wherein the driver information comprises a driver's name.

3. The computer-implemented method of claim 2, wherein the driver information comprises a driver mobile device number.

4. The computer-implemented method of claim 1, wherein when the user clicks on the hyperlink the message that the driver has clicked on the link is automatically generated by the mobile device and communicated to a server implementing the driver registration/tracking application server functionality.

5. The computer-implemented method of claim of 1 further comprising:
    detecting that the driver has clicked on the virtual button.

6. The computer-implemented method of claim 5 further comprising:
    registering and tracking the mobile device of the driver of a container vehicle.

7. The computer-implemented method of claim 6, wherein the computer network comprises a text-messaging network.

8. A computerized system for one-click registration drivers in a load transport network via a mobile device messaging application comprising:
    a processor;
    a memory containing instructions when executed on the processor, causes the processor to perform operations that:
    obtain a driver information in a digital format;
    pass via a computer network, the driver information to a driver registration/tracking application programming interface (API);
    store the driver information in a database;
    generate a hyperlink and send hyperlink to driver's smart phone as a text message, hyperlink includes a parameter mapped to the driver;
    receive a message that the driver has clicked on the hyperlink;
    download a driver registration/tracking application to the mobile device after the driver has clicked on the hyperlink;
    with the driver registration/tracking application, request, and fetch, with a driver registration/tracking application server functionality, the driver information from the database; and
    load the driver information into the driver registration/tracking application and one-click set up is presented via a virtual button displayed with the mobile device.

9. The computerized system of claim 8, wherein the driver information comprises a driver's name.

10. The computerized system of claim 9, wherein the driver information comprises a driver mobile device number.

11. The computerized system of claim 10, wherein when the user clicks on the hyperlink the message that the driver has clicked on the link is automatically generated by the mobile device and communicated to a server implementing the driver registration/tracking application server functionality.

12. The computerized system of claim of 11, wherein memory containing instructions when executed on the processor, causes the processor to perform operations that:
    detect that the driver has clicked on the virtual button.

13. The computerized system of claim 12, wherein the memory containing instructions when executed on the processor, causes the processor to perform operations that:
    register and track the mobile device of the driver of a container vehicle.

14. The computerized system of claim 13, wherein the computer network comprises a text-messaging network.

15. The computerized system of claim 14, wherein the driver does not type input into the mobile device.

* * * * *